United States Patent [19]
O'Berto

[11] 3,954,018
[45] May 4, 1976

[54] PULLEY DRIVE CONTROL SYSTEM

[75] Inventor: Gerald N. O'Berto, Wheaton, Ill.

[73] Assignee: Lovejoy, Inc., Downers Grove, Ill.

[22] Filed: Nov. 8, 1974

[21] Appl. No.: 521,965

[52] U.S. Cl.............................. 74/230.17 A; 340/263; 340/267 R
[51] Int. Cl.² ........................................... F16H 58/52
[58] Field of Search............ 74/230.17 A, 230.17 C, 74/230.17 R, 217 R, 217 CV, 336, 230.17; 340/263, 267 R; 324/161; 317/5

[56] References Cited
UNITED STATES PATENTS

| | | | |
|---|---|---|---|
| 3,117,461 | 1/1964 | Fermier........................ | 74/230.17 C |
| 3,491,608 | 1/1970 | Trofimov ..................... | 74/230.17 C |
| 3,560,854 | 2/1971 | Moss et al..................... | 324/161 |
| 3,643,519 | 2/1972 | Ebersold...................... | 74/230.17 A |
| 3,764,888 | 10/1973 | Anderson........................... | 324/161 |

*Primary Examiner*—Samuel Scott
*Assistant Examiner*—A. Russell Burke
*Attorney, Agent, or Firm*—Kinzer, Plyer, Dorn & McEachran

[57] ABSTRACT

A pulley drive system utilizes a driven pulley and a driving pulley and a belt connecting the pulleys. The driving pulley has spaced discs and there are means for varying the spacing between the discs to vary the speed of the belt driving the driven pulley. Speed sensing means are positioned adjacent the driven pulley to provide a signal representative of the speed of the driven pulley. The speed sensing signal is utilized in a regulating circuit to control the means for varying the spacing between the discs to thus control the speed of the belt.

6 Claims, 3 Drawing Figures

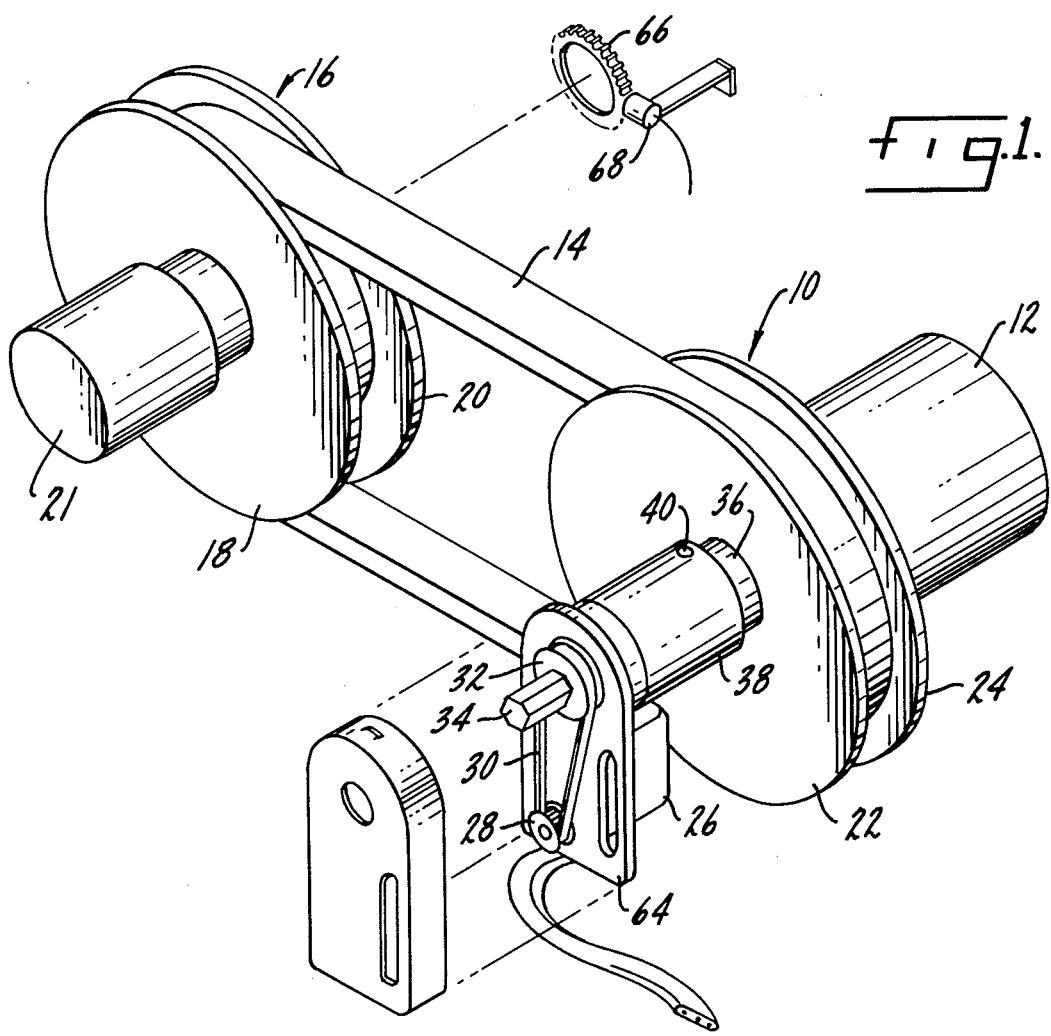
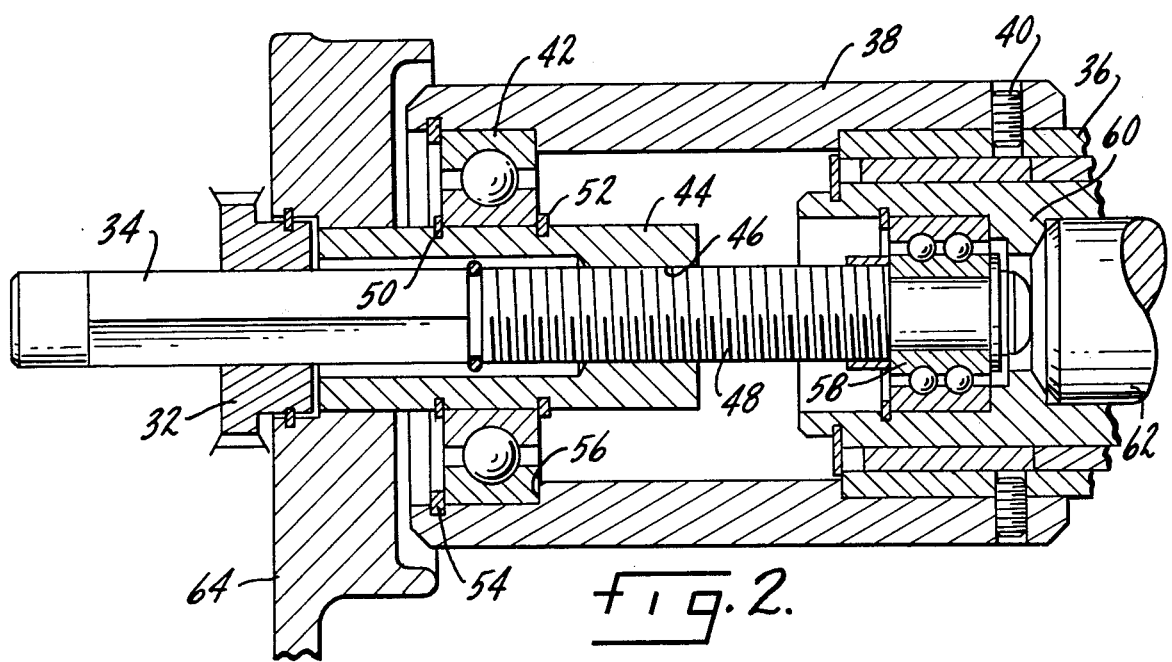

PULLEY DRIVE CONTROL SYSTEM

SUMMARY OF THE INVENTION

The present invention relates to a pulley drive system and in particular to electrical circuit means providing positive speed control of the driven pulley.

A primary purpose of the invention is a control system of the type escribed utilizing a reliable simply constructed control circuit.

Another purpose is a pulley drive control system utilizing a regulating circuit which compares the amplitude of a signal representative of driven pulley speed with a signal representative of the desired speed.

Another purpose is a pulley drive control system regulating circuit utilizing a minimum number of components.

Another purpose is a system of the type described including a regulating circuit controlling operation of a disc spacing motor.

Other purposes will appear in the ensuing specification, drawings and claims.

BRIEF DESCRIPTION OF THE DRAWINGS

The invention is illustrated diagrammatically in the following drawings wherein:

FIG. 1 is a perspective of a pulley system,

FIG. 2 is a partial axial section through the means for varying the spacing between the driving pulley discs.

DESCRIPTION OF THE PREFERRED EMBODIMENT

Figure 3:
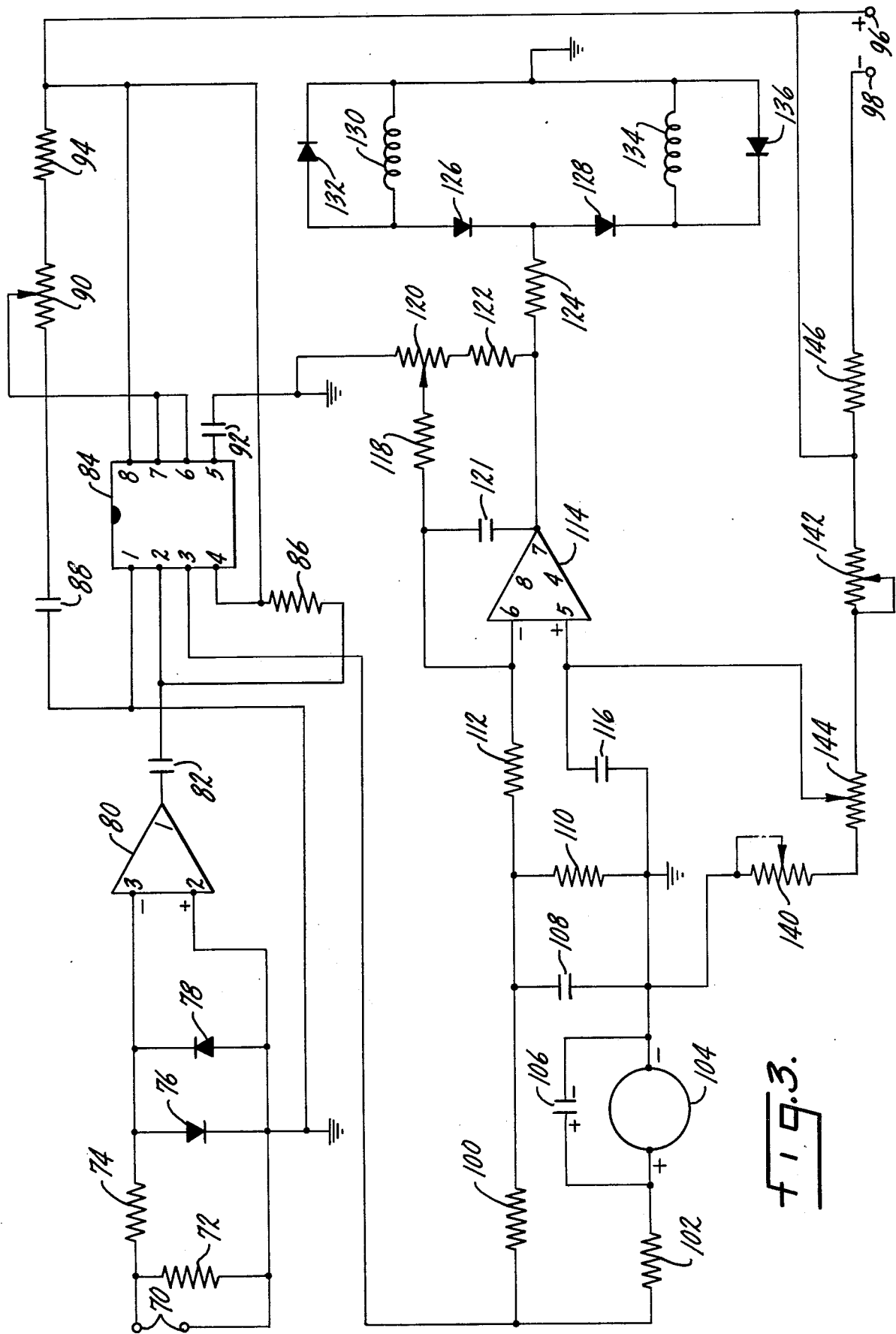
FIG. 3 is a diagram of the control circuit.

Looking particularly at FIGS. 1 and 2, a driving pulley is indicated generally at 10 and may be driven by a conventional motor 12. A belt 14 connects the driving pulley 10 with a driven pulley 16. The pulley 16 has spaced discs 18 and 20, with the spacing between the discs being controlled by a cartridge assembly of spring covers indicated generally at 21 and illustrated in detail in U.S. Pat. No. 3,736,804.

The speed of belt 14 is controlled by the spacing between discs 22 and 24 of driving pulley 10. The spacing between these discs is in turn controlled by a gear motor 26 driving a small gear 28 which, through a belt 30, drives a larger gear 32 fixed on a hex-shaped shaft 34. The spacing between discs 22 and 24 will determine the radial position of the belt 14 as it passes about pulley 10 and this in turn will determine the speed of the driven pulley 16.

Looking particularly at FIG. 2, pulley disc 22 may have an integral axially-extending sleeve 36 which is pinned to a sleeve 38 by a pin 40. Thus, axial movement of sleeve 38 will cause axial movement of disc 22. Sleeve 38 is mounted by bearing 42 on an inner sleeve 44 which is threadedly engaged by a collar portion or the like 46 to a threaded section 48 of the hex-shaped shaft 34. Bearing 42 is fastened by snap rings 50 and 52 on opposite sides thereof to the sleeve 44 and by a snap ring 54 and a shoulder 56 to sleeve 38. Thus, axial movement of sleeve 44 and bearing 42 will cause axial movement of sleeve 38.

A bearing 58 is fastened to the end of hex-shaped shaft 34 and is supported by a sleeve 60 adjacent the end of the pulley shaft 62.

A support plate 64, shown in FIGS. 1 and 2, mounts large pulley gear 32, gear motor 26, as well as small pulley gear 28. Thus, rotation of gear motor 26 drives small pulley gear 28 and through belt 30 large pulley gear 32. As pulley gear 32 rotates, so does shaft 34 because of its hex shape. Rotation of the shaft will cause sleeve 44 to axially move upon the shaft which in turn, through the sleeve arrangement described above, will vary the spacing of pulley disc 22 relative to pulley disc 24.

Positioned on the shaft of driven pulley 16 is a timing gear 66 and positioned adjacent the timing gear 66 is an electric pickup 68. Pickup 68 will provide a sine wave output with a frequency directly related to the speed of timing gear 66. For example, assuming gear 66 has 60 teeth and the driven pulley 16 is operating at 500 rpm, there will be a 500 hz sine wave signal provided by pickup 68.

Looking at FIG. 3, the signal from pickup 68 is applied to terminals 70. A loading resistor 72 is connected between terminals 70 and a voltage limiting resistor 74 is connected to one end of resistor 72 and to two protection diodes 76 and 78. The combination of resistor 74 and the diodes 76 and 78 will limit the signal input to a predetermined maximum level. An operational amplifier 80 has its inverting terminal connected to one side of resistor 74 and its non-inverting terminal connected to the bottom of resistor 72. The input to operational amplifier 80 is a sine wave with the output on terminal 1 of amplifier 80 being a square wave. An integrating capacitor 82 is connected to the output of amplifier 80 and connects the amplifier to an integrated circuit timer 84. Timer 84 may typically be an integrated circuit known as 555, whereas, the operational amplifier 80 may be a Motorola MC1558.

Terminal 2 of timer 84 is the input terminal and terminal 4 is the reset terminal and is connected by a resistor 86 to terminal 2. The output is terminal 3. Terminal 1 is connected through a timing capacitor 88 to a resistor 90 with the wiper of resistor 90 being connected to terminals 6 and 7 of timer 84. Terminal 5 of the timer 84 is connected through a capacitor 92 to ground. Terminal 6 is connected to timing capacitor 88, as is terminal 7, with terminal 6 determining the time at which the timing cycle is initiated, which time is determined by the charging period of capacitor 88 as controlled by variable resistor 90 and resistor 94. Terminal 7 provides for discharge of capacitor 88 at the end of the timing cycle. Resistor 90 is effective to adjust pulse width. The frequency of the output at terminal 3 is dependent upon the input frequency, whereas, the pulse width is determined by the setting of resistor 90.

The input voltage to the entire circuit, for example, may be plus and minus 15 volts and it is essential that this voltage be very stable and carefully controlled. The positive voltage terminal is indicated at 96 and the negative voltage terminal at 98, with terminal 96 being connected to terminal 8 of timer 84.

The output from timer 84 is thus a pulse train whose frequency is directly related to the speed of driven pulley 16 and whose pulse width is carefully controlled by resistor 90. This output is connected to resistors 100 and 102. Resistor 102 is connected to a tachometer meter 104 which can be calibrated to read directly in rpm. Meter 104 has a squaring bypass capacitor 106 and then is connected to a capacitor 108 which is also connected to resistor 100. In parallel with capacitor 108 is a resistor 110, with resistor 110 in turn being connected to a resistor 112 and then to the inverting input of an operational amplifier 114. The bottom side of resistor 110 is connected through a capacitor 116 to the non-inverting input of operational amplifier 114. The effect of the above-described circuit is to convert the pulse train from terminal 3 of the timer 84 into an analog ripple-free voltage whose amplitude is directly related to the frequency of the pulse train.

Amplifier 114 may be a part of amplifier 80, as a Motorola MC1558 provides two amplifier circuits.

Connected to resistor 112 is a resistor 118 which is connected to the wiper of a variable resistor 120, the upper side of which is grounded and the lower side of which is connected to a resistor 122. Resistor 122 in turn is connected to a resistor 124 and to the output terminal of the amplifier 114.

Resistor 124 is connected to the cathode of a diode 126 and to the anode of a second diode 128. Diode 128 is connected to a relay coil 130 in parallel with a diode 132. In like manner, the cathode of diode 128 is connected to a relay coil 134 which is in parallel with a diode 136. The above-described circuit is used to drive gear motor 26 to vary the disc spacing as described.

The positive terminal 98 of the input voltage is connected through a series of resistors to the non-inverting input of amplifier 114. Variable resistor 140 is the minimum speed adjust resistor which determines the minimum voltage that can be applied to the non-inverting input of amplifier 114. In like manner, variable resistor 142 determines the maximum voltage that can be applied. Variable resistor 144 will have an external adjustment to vary the desired speed of driven pulley 16. A further resistor 146 is connected directly to negative voltage terminal 98.

In operation, if input terminals 5 and 6 of amplifier 114 have exactly the same voltage, the output at terminal 7 is zero voltage relative to ground. If, however, terminal 6 has a higher voltage than terminal 5, with the voltage at terminal 5 being controlled by the variable resistors described, and the voltage at terminal 6 being determined by the frequency of the signal applied to terminals 70, the output at terminal 7 is negative with respect to ground. In this case, diode 126 will conduct, which will close the relay associated with coil 130, which will drive the gear motor 26 in a predetermined direction. The opposite result will take place if the voltage at terminal 7 of amplifier 114 is positive, in which case diode 128 would conduct and the relay associated with coil 134 would be operated to drive the gear motor in the opposite direction.

The feedback circuit associated with resistors 120, 122 and 118, and capacitor 121, provides both feedback and sensitivity adjustment. Thus, to avoid hunting of the system, the sensitivity adjustment can be so arranged that a predetermined speed differential is required before either one of the relays controlling gear motor 26 will be operated to cause the gear motor to vary the spacing between the pulley discs. In addition, the feedback network assures that there is a ripple-free output at terminal 7 of amplifier 114.

Diodes 132 and 136 in parallel with coils 130 and 134 are clamping diodes preventing inverse kickback in the circuit after operation of the gear motor 26.

Thus, timing gear 66 and pickup 68 provide a sine wave signal having a frequency directly related to the speed of driven pulley 16. This sine wave signal is converted into a pulse train having a predetermined pulse width with the frequency of the pulse train being directly related to the frequency of the input sine wave. The series of pulses is converted to an analog voltage whose amplitude is directly related to the input frequency and this analog voltage is compared with a voltage representative of the desired speed of driven pulley 16. Variation between the two analog voltages will cause one of two relays to operate to cause gear motor 26 to change the spacing between pulley discs 22 and 24 to thus change the speed of driven pulley 16.

Whereas the preferred form of the invention has been shown and described herein, it should be realized that there may be many modifications, substitutions and alterations thereto.

The embodiments of the invention in which an exclusive property or privilege is claimed are defined as follows:

1. A pulley drive control system including a driven pulley, a driving pulley, belt means connecting said pulleys, said driving pulley having spaced discs, means for varying the spacing between said discs to vary the speed of said belt means, speed sensing means adjacent said driven pulley for providing an electrical signal representative of the speed of said driven pulley, and regulating circuit means connected to said sensing means for using said speed signal to provide an adjustment signal to operate said means for varying the disc spacing, said regulating circuit means including comparison circuit means for comparing the electrical signal representative of the speed of said driven pulley with a signal representative of the desired speed of said driven pulley, and means for varying the amplitude of said signal representative of the desired speed of said driven pulley.

2. The control system of claim 1 further characterized in that said speed sensing means provides a sine wave signal representative of the speed of said driven pulley, said regulating circuit means including means for changing said sine wave signal into a series of pulses representative of the speed of said driven pulley.

3. The system of claim 2 further characterized by and including means for converting said series of pulses into an analog voltage representative of the frequency of said sine wave.

4. The system of claim 3 further characterized by and including an operational amplifier for comparing the voltage representative of the speed of said driven pulley with a predetermined voltage representative of the desired speed of said driven pulley.

5. The system of claim 1 further characterized in that the means for varying the spacing between said discs includes a sleeve attached to one of said discs, a motor and a driving connection between said motor and said sleeve for axially moving said sleeve.

6. The structure of claim 5 further characterized by and including a shaft, said sleeve being axially movable on said shaft, a gear on said shaft and a driving connection between said gear and said motor.

* * * * *